US010931813B1

(12) United States Patent
Kim et al.

(10) Patent No.: US 10,931,813 B1
(45) Date of Patent: Feb. 23, 2021

(54) ARTIFICIAL INTELLIGENCE APPARATUS FOR PROVIDING NOTIFICATION AND METHOD FOR SAME

(71) Applicant: LG ELECTRONICS INC., Seoul (KR)

(72) Inventors: Taehyun Kim, Seoul (KR); Jonghoon Chae, Seoul (KR); Jichan Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/734,263

(22) Filed: Jan. 3, 2020

(30) Foreign Application Priority Data

Nov. 12, 2019 (KR) .................. 10-2019-0144556

(51) Int. Cl.
H04M 1/72 (2006.01)
H04M 1/725 (2021.01)
H04M 19/04 (2006.01)
H04W 4/02 (2018.01)
G06N 3/08 (2006.01)
G01C 19/00 (2013.01)
G01P 15/16 (2013.01)
G06N 3/04 (2006.01)

(52) U.S. Cl.
CPC ........ *H04M 1/72569* (2013.01); *G01C 19/00* (2013.01); *G01P 15/16* (2013.01); *G06N 3/04* (2013.01); *G06N 3/08* (2013.01); *H04M 19/047* (2013.01); *H04W 4/025* (2013.01); *H04M 2250/12* (2013.01)

(58) Field of Classification Search
CPC ............ H04M 1/72569; H04M 19/047; G01C 19/00; G01P 15/16; G06N 3/04; G06N 3/08; H04W 4/02
See application file for complete search history.

(56) References Cited

U.S. PATENT DOCUMENTS

| 7,059,182 | B1 * | 6/2006 | Ragner | ................ | H05K 5/0086 |
| | | | | | 73/200 |
| 9,075,435 | B1 * | 7/2015 | Noble | ..................... | G06F 3/013 |
| 2009/0311941 | A1 * | 12/2009 | Bickerton | ............. | A63H 11/02 |
| | | | | | 446/3 |
| 2011/0194230 | A1 * | 8/2011 | Hart | ...................... | H04M 1/185 |
| | | | | | 361/437 |
| 2013/0073095 | A1 * | 3/2013 | King | ..................... | H04M 1/185 |
| | | | | | 700/279 |

(Continued)

Primary Examiner — Md K Talukder
(74) Attorney, Agent, or Firm — Lee, Hong, Degerman, Kang & Waimey

(57) ABSTRACT

The present disclosure provides an artificial intelligence apparatus includes a haptic module configured to output a vibration notification, a microphone configured to obtain noise data generated by the vibration notification, a gyro sensor configured to obtain equilibrium state information of the artificial intelligence apparatus, and a processor configured to obtain floor strength information output by a floor strength prediction model by providing the equilibrium state information and the noise data to the floor strength prediction model which outputs the floor strength information of a floor on which the artificial intelligence apparatus is placed, and determine vibration notification strength based on the floor strength information.

18 Claims, 6 Drawing Sheets

(56) References Cited

U.S. PATENT DOCUMENTS

| | | | | |
|---|---|---|---|---|
| 2013/0257582 A1* | 10/2013 | Rothkopf | ............. | G06F 1/1656 340/3.1 |
| 2014/0253284 A1* | 9/2014 | Peterson | ............. | H04B 1/3888 340/3.1 |
| 2016/0018278 A1* | 1/2016 | Jeter, II | ................ | G01L 5/0052 340/665 |
| 2018/0054502 A1* | 2/2018 | Wilson | ................ | G06F 1/1633 |

* cited by examiner

ARTIFICIAL INTELLIGENCE APPARATUS FOR PROVIDING NOTIFICATION AND METHOD FOR SAME

CROSS-REFERENCE TO RELATED APPLICATIONS

Pursuant to 35 U.S.C. § 119(a), this application claims the benefit of earlier filing date and right of priority to Korean Patent Application No. 10-2019-0144556, filed on Nov. 12, 2019, the contents of which are all hereby incorporated by reference herein in its entirety.

BACKGROUND

The present disclosure relates to an artificial intelligence apparatus for providing a notification and a method for the same.

Artificial intelligence is a field of computer engineering and information technology for researching a method of enabling a computer to do thinking, learning and self-development that can be done by human intelligence, and means that a computer can imitate a human intelligent action.

In addition, artificial intelligence does not exist in itself but has many direct and indirect associations with the other fields of computer science. In particular, today, attempts to introduce artificial intelligent elements to various fields of information technology to deal with issues of the fields have been actively made.

Meanwhile, technology for recognizing and learning a surrounding situation using artificial intelligence and providing information desired by a user in a desired form or performing a function or operation desired by the user is actively being studied.

An electronic device for providing such operations and functions may be referred to as an artificial intelligence apparatus.

Meanwhile, a device such as a smartphone provides a notification to let a user know when a message, a call, or the like is received.

However, if a notification is provided regardless of the situation where a device such as a smartphone is placed, the notification may cause damage.

Accordingly, the necessity of a function that can determine the situation where the smartphone is placed and provide an optimal notification is increasing.

SUMMARY

An object of the present disclosure is to solve the above and other problems.

An object of the present disclosure is to provide an artificial intelligence apparatus which adjusts a notification to prevent falling due to the notification and damage caused by the falling.

An object of the present disclosure is to provide an artificial intelligence apparatus that prevents the falling by adjusting the vibration notification by itself by the artificial intelligence apparatus which is placed in a non-horizontal position such as an inclined table.

An object of the present disclosure is to provide an artificial intelligence apparatus which adjusts a notification by determining a situation where an artificial intelligence apparatus is placed using noise data generated as a vibration notification.

An object of the present disclosure is to provide an artificial intelligence apparatus which adjusts a notification according to a situation where an artificial intelligence apparatus is placed.

An object of the present disclosure is to provide an artificial intelligence apparatus which adjusts the notification by predicting the movement of the artificial intelligence apparatus due to the notification.

An embodiment of the present disclosure provides an artificial intelligence apparatus including: a haptic module configured to output a vibration notification; a microphone configured to obtain noise data generated by the vibration notification; a gyro sensor configured to obtain equilibrium state information of the artificial intelligence apparatus; and a processor configured to: obtain floor strength information output by a floor strength prediction model by providing the equilibrium state information and the noise data to the floor strength prediction model which outputs the floor strength information of a floor on which the artificial intelligence apparatus is placed, and determine vibration notification strength based on the floor strength information.

In addition, an embodiment of the present disclosure provides a method for providing a notification including: outputting a vibration notification; obtaining noise data generated due to the vibration notification; obtaining equilibrium state information of the artificial intelligence apparatus; obtaining the floor strength information output by a floor strength prediction model by providing the equilibrium state information and the noise data to a floor strength prediction model which outputs floor strength information of a floor on which the artificial intelligence apparatus is placed; and determining the vibration notification strength based on the floor strength information.

According to an embodiment of the present disclosure, it is possible to prevent the falling due to the notification and the damage caused due to the falling by adjusting the notification strength.

In addition, according to various embodiments of the present disclosure, an artificial intelligence apparatus placed in a non-horizontal position such as an inclined table may prevent from falling by adjusting the vibration notification by itself.

In addition, according to various embodiments of the present disclosure, the falling of the artificial intelligence apparatus may be prevented by adjusting the notification by determining a situation where the artificial intelligence apparatus is placed using the noise data generated as the vibration notification.

In addition, according to various embodiments of the present disclosure, the falling of the artificial intelligence apparatus may be prevented by adjusting the notification according to the situation where the artificial intelligence apparatus is placed.

In addition, according to various embodiments of the present disclosure, the falling of the artificial intelligence apparatus may be prevented by adjusting the notification by predicting the movement of the artificial intelligence apparatus due to the notification.

DETAILED DESCRIPTION OF THE EMBODIMENTS

Figure 1:
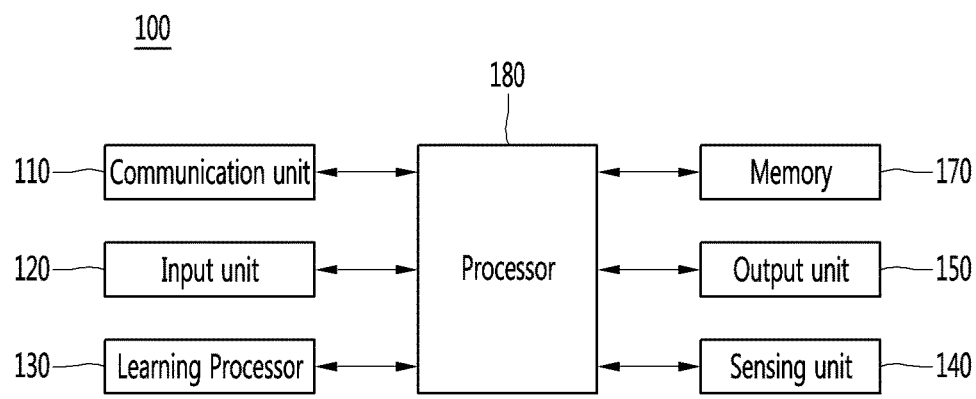
FIG. 1 illustrates an AI device according to an embodiment of the present disclosure.

Hereinafter, embodiments of the present disclosure are described in more detail with reference to accompanying drawings and regardless of the drawings, symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues.

Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a preset route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may obtain various kinds of data.

At this time, the input unit 120 may include a camera for inputting a video signal, a microphone for receiving an audio signal, and a user input unit for receiving information from a user. The camera or the microphone may be treated as a sensor, and the signal obtained from the camera or the microphone may be referred to as sensing data or sensor information.

The input unit 120 may obtain a learning data for model learning and an input data to be used when an output is obtained by using learning model. The input unit 120 may obtain raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may obtain at least one of internal information on the AI device 100, ambient environment information on the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data obtained by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may obtain intention information for the user input and may determine the user's requirements based on the obtained intention information.

The processor 180 may obtain the intention information corresponding to the user input by using at least one of a speech to text (STT) engine for converting speech input into a text string or a natural language processing (NLP) engine for obtaining intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
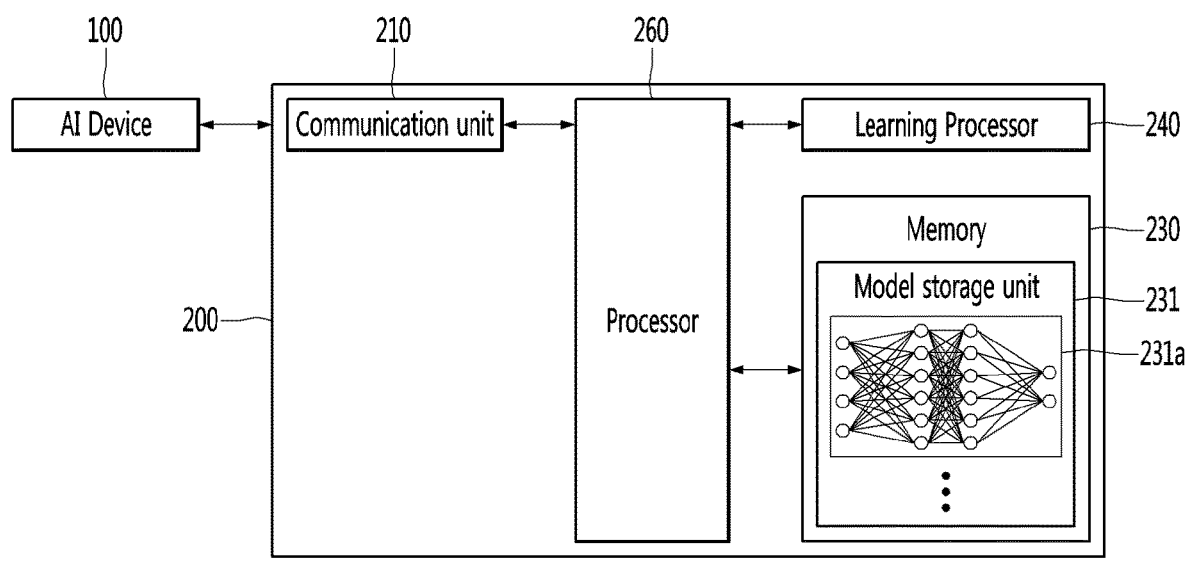
FIG. 2 illustrates an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
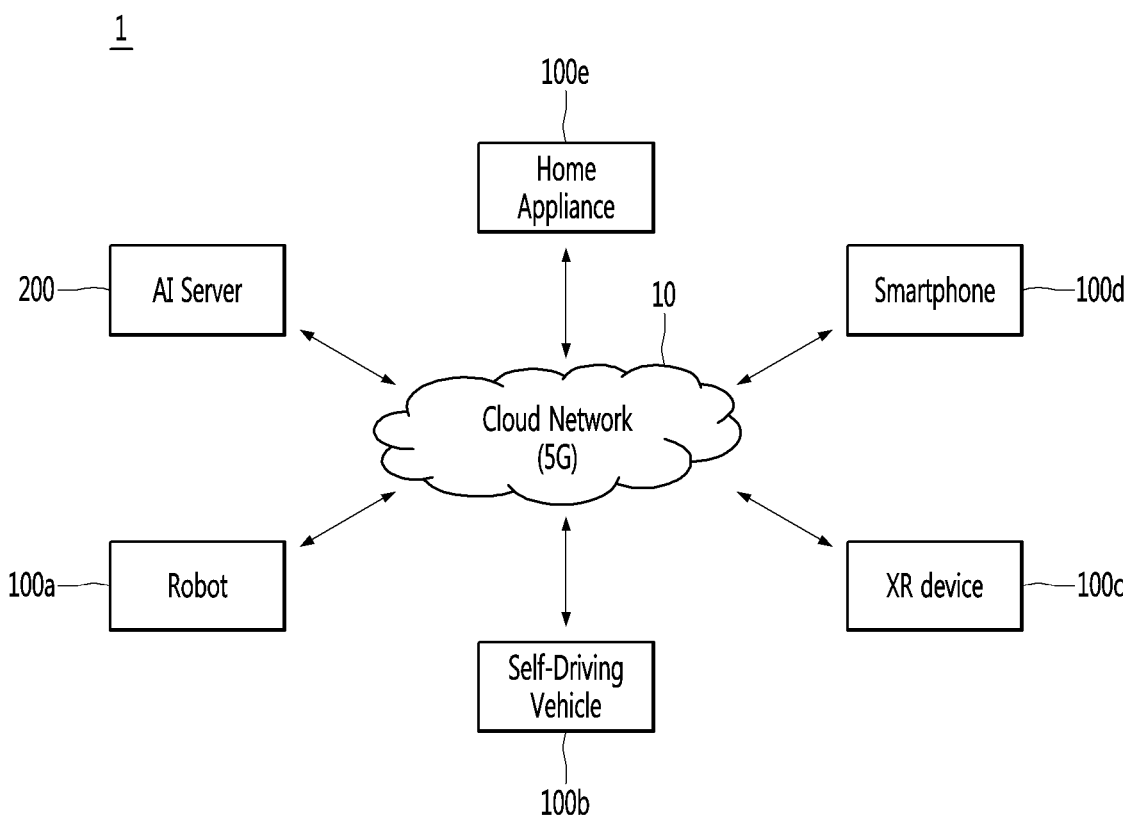
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

In other words, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the received input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may obtain state information on the robot 100*a* by using sensor information obtained from various kinds of sensors, may detect (recognize) surrounding environment and objects, may generate map data, may determine the route and the travel plan, may determine the response to user interaction, or may determine the operation.

The robot 100a may use the sensor information obtained from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information obtained from the external apparatus to determine the travel route and the travel plan, and may control the driving unit such that the robot 100a travels along the determined travel route and travel plan.

The map data may include object identification information on various objects arranged in the space in which the robot 100a moves. For example, the map data may include object identification information on fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may obtain the intention information of the interaction due to the user's operation or speech utterance, and may determine the response based on the obtained intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may obtain state information on the self-driving vehicle 100b by using sensor information obtained from various kinds of sensors, may detect (recognize) surrounding environment and objects, may generate map data, may determine the route and the travel plan, or may determine the operation.

Like the robot 100a, the self-driving vehicle 100b may use the sensor information obtained from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information obtained from the external apparatus to determine the travel route and the travel plan, and may control the driving unit such that the self-driving vehicle 100b travels along the determined travel route and travel plan.

The map data may include object identification information on various objects arranged in the space (for example, road) in which the self-driving vehicle 100b travels. For example, the map data may include object identification information on fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may obtain the intention information of the interaction due to the user's operation or speech utterance, and may determine the response based on the obtained intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data obtained from various sensors or the external devices, generate position data and attribute data for the three-dimensional points, obtain information on the surrounding space or the real object, and render to output the XR object to be output. For example, the XR device 100c may output an XR object including the additional information on the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by obtaining sensor information on behalf of the self-driving vehicle 100*b* and providing the sensor information to the self-driving vehicle 100*b*, or by obtaining sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from the XR device 100*c* and interwork with each other.

When the robot 100*a*, which is subjected to control/interaction in the XR image, may obtain the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information on the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving driving vehicle 100*b*, to which the XR technology is applied, may refer to a self-driving vehicle having a means for providing an XR image or a self-driving vehicle that is subjected to control/interaction in an XR image. Particularly, the self-driving vehicle 100*b* that is subjected to control/interaction in the XR image may be distinguished from the XR device 100*c* and interwork with each other.

The self-driving vehicle 100*b* having the means for providing the XR image may obtain the sensor information from the sensors including the camera and output the generated XR image based on the obtained sensor information. For example, the self-driving vehicle 100*b* may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

When the self-driving vehicle 100*b*, which is subjected to control/interaction in the XR image, may obtain the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
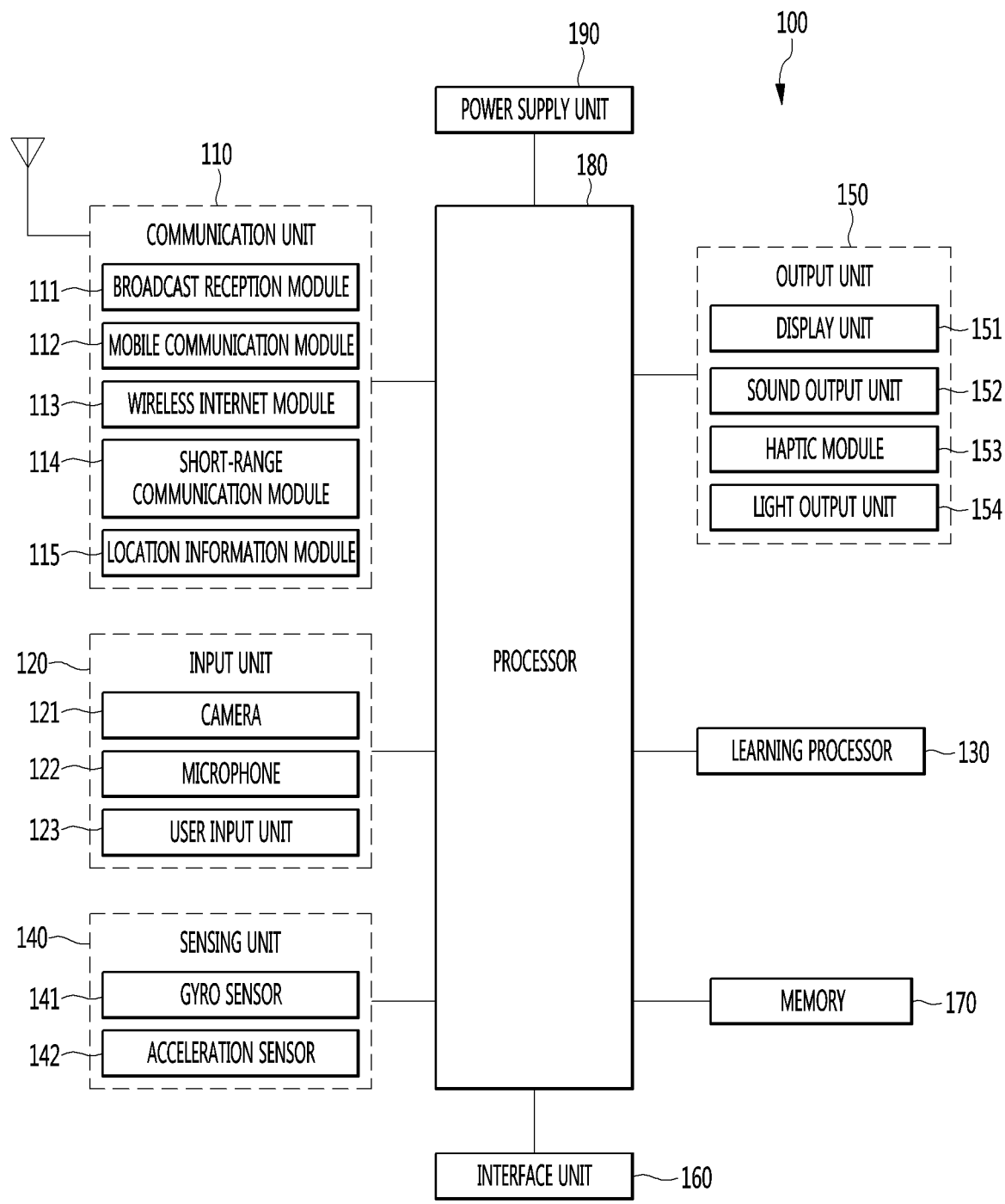
FIG. 4 is a block diagram illustrating an artificial intelligence apparatus according to the present disclosure.

FIG. 4 is a block diagram illustrating an artificial intelligence apparatus according to the present disclosure.

A description overlapping FIG. 1 will be omitted.

The communication unit 110 may include at least one of a broadcast reception module 111, a mobile communication module 112, a wireless Internet module 113, a short-range communication module 114 and a location information module 115.

The broadcast reception module 111 receives broadcast signals and/or broadcast associated information from an external broadcast management server through a broadcast channel.

The mobile communication module 112 may transmit and/or receive wireless signals to and from at least one of a base station, an external terminal, a server, and the like over a mobile communication network established according to technical standards or communication methods for mobile communication (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless Internet module 113 is configured to facilitate wireless Internet access. This module may be installed inside or outside the artificial intelligence apparatus 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

The short-range communication module 114 is configured to facilitate short-range communication and to support short-range communication using at least one of Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information module 115 is generally configured to obtain the position (or the current position) of the mobile artificial intelligence apparatus. Representative examples thereof include a Global Position System (GPS) module or a Wi-Fi module. As one example, when the artificial intelligence apparatus uses a GPS module, the position of the mobile artificial intelligence apparatus may be obtained using a signal sent from a GPS satellite.

The input unit 120 may include a camera 121 for receiving a video signal, a microphone 122 for receiving an audio signal, and a user input unit 123 for receiving information from a user.

The camera 121 may process image frames of still images or moving images obtained by image sensors in a video call more or an image capture mode. The processed image frames can be displayed on the display 151 or stored in memory 170.

The microphone 122 processes an external acoustic signal into electrical audio data. The processed audio data may be variously used according to function (application program) executed in the artificial intelligence apparatus 100. Meanwhile, the microphone 122 may include various noise removal algorithms to remove noise generated in the process of receiving the external acoustic signal.

The user input unit 123 receives information from a user. When information is received through the user input unit 123, the processor 180 may control operation of the artificial intelligence apparatus 100 in correspondence with the input information.

The user input unit 123 may include one or more of a mechanical input element (for example, a mechanical key, a button located on a front and/or rear surface or a side surface of the artificial intelligence apparatus 100, a dome switch, a jog wheel, a jog switch, and the like) or a touch input element. As one example, the touch input element may be a virtual key, a soft key or a visual key, which is displayed on a touchscreen through software processing, or a touch key located at a location other than the touchscreen.

The sensing unit 140 may include at least one of a gyro sensor 141 and an acceleration sensor 142.

The gyro sensor 141 is a sensor which detects inertia of an object as an electrical signal and mainly senses a rotation angle and may sense a height, a rotation, an inclination, and the like. In addition, the gyro sensor 141 may obtain the equilibrium state information of the artificial intelligence apparatus 100 by sensing information on a height, a rotation, and an inclination of the artificial intelligence apparatus 100.

The acceleration sensor 142 is a sensor which detects a change in the object speed per unit time and may sense dynamic forces such as acceleration, vibration, and impact. In addition, the acceleration sensor 142 may sense dynamic force such as acceleration, vibration, and impact of the artificial intelligence apparatus 100 to obtain movement information on a movement distance and a movement direction of the artificial intelligence apparatus 100.

The output unit 150 is typically configured to output various types of information, such as audio, video, tactile output, and the like. The output unit 150 may include a display 151, an audio output module 152, a haptic module 153, and a light output unit 154.

The display 151 is generally configured to display (output) information processed in the artificial intelligence apparatus 100. For example, the display 151 may display execution screen information of an application program executed by the artificial intelligence apparatus 100 or user interface (UI) and graphical user interface (GUI) information according to the executed screen information.

The display 151 may have an inter-layered structure or an integrated structure with a touch sensor in order to realize a touchscreen. The touchscreen may provide an output interface between the artificial intelligence apparatus 100 and a user, as well as function as the user input unit 123 which provides an input interface between the artificial intelligence apparatus 100 and the user.

The audio output module 152 is generally configured to output audio data received from the communication unit 110 or stored in the memory 170 in a call signal reception mode, a call mode, a record mode, a speech recognition mode, a broadcast reception mode, and the like.

The audio output module 152 may also include a receiver, a speaker, a buzzer, or the like.

A haptic module 153 can be configured to generate various tactile effects that a user feels. A typical example of a tactile effect generated by the haptic module 153 is vibration.

A light output unit 154 may output a signal for indicating event generation using light of a light source of the artificial intelligence apparatus 100. Examples of events generated in the artificial intelligence apparatus 100 may include message reception, call signal reception, a missed call, an alarm, a schedule notice, email reception, information reception through an application, and the like.

The interface 160 serves as an interface with external devices to be connected with the artificial intelligence apparatus 100. The interface 160 may include wired or wireless headset ports, external power supply ports, wired or wireless data ports, memory card ports, ports for connecting a device having an identification module, audio input/output (I/O) ports, video I/O ports, earphone ports, or the like. The artificial intelligence apparatus 100 may perform appropriate control related to the connected external device in correspondence with connection of the external device to the interface 160.

The identification module may be a chip that stores a variety of information for granting use authority of the artificial intelligence apparatus 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the artificial intelligence apparatus 100 via the interface 160.

The power supply 190 receives external power or internal power and supplies the appropriate power required to operate respective components included in the artificial intelligence apparatus 100, under control of the controller 180. The power supply 190 may include a battery, and the battery may be a built-in or rechargeable battery.

Meanwhile, as described above, the processor 180 controls operation related to the application program and overall operation of the artificial intelligence apparatus 100. For example, the processor 180 may execute or release a lock function for limiting input of a control command of the user to applications when the state of the mobile artificial intelligence apparatus satisfies a set condition.

Figure 5:
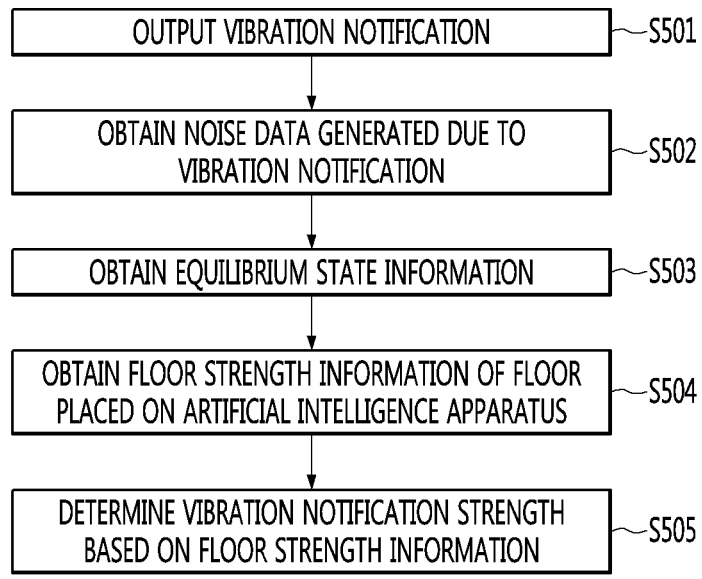
FIG. 5 is an operation flowchart illustrating a method for determining a vibration notification strength using floor strength information according to an embodiment of the present disclosure.

FIG. 5 is an operation flowchart illustrating a method for determining a vibration notification strength using floor strength information according to an embodiment of the present disclosure.

The haptic module 153 may output a vibration notification (S501).

The vibration notification may be a notification generated due to the vibration of the artificial intelligence apparatus 100 if the artificial intelligence apparatus 100 receives a call or a message or a notification occurs in the operating system or an application.

The processor 180 may output a vibration notification through the haptic module 153 if receiving a call or a message or generating a notification in an operating system or an application.

The haptic module 153 may generate vibration by moving the artificial intelligence apparatus 100 so that the user may notice that there is a notification.

The microphone 122 may obtain noise data generated by the vibration notification (S502).

For example, if the artificial intelligence apparatus 100 is placed adjacent to the floor, noise may be generated due to the vibration notification output by the haptic module 153. The microphone 122 may obtain by receiving an audio signal generated by the vibration notification output by the haptic module 153.

In addition, the operation of the microphone 122 may be started to obtain noise data if the haptic module 153 outputs a vibration notification.

In addition, the microphone 122 may obtain noise data generated due to each vibration notification if the vibration notification occurs a plurality of times by the haptic module 153. For example, if the haptic module 153 sequentially and continuously outputs a first vibration notification and a second vibration notification, the microphone 122 can sequentially and continuously obtain noise data generated by the first vibration notification and noise data generated by the second vibration notification. Therefore, the microphone 122 may separately obtain each of the noise data generated by the sequentially generated vibration notification, and the processor 180 may use the noise data for each of the vibration notifications.

The gyro sensor 141 may obtain the equilibrium state information of the artificial intelligence apparatus 100 (S503).

The equilibrium state information may include information on the height, the rotation, and the inclination of the artificial intelligence apparatus 100.

The gyro sensor 141 may obtain the equilibrium state information of the artificial intelligence apparatus 100 whenever the vibration notification is output by the haptic module 153. Therefore, the gyro sensor 141 obtains the equilibrium state information of the artificial intelligence apparatus 100 whenever the plurality of vibration notifications are sequentially output, so that the processor 180 can use the plurality of obtained equilibrium state information to check the effects on the equilibrium state of the artificial intelligence apparatus 100.

The processor 180 may obtain floor strength information of a floor on which the artificial intelligence apparatus 100 is placed using the floor strength prediction model (S504).

Information on floor strength may be classified by the material of the floor. For example, a floor made of soft material such as leather or fabric may be distinguished by soft strength. In addition, a floor made of a material such as glass, wood, plastic, marble, or the like may be set to hard strength. Therefore, the floor strength information may include information on the material of the floor on which the artificial intelligence apparatus 100 is placed.

In addition, the processor 180 may obtain friction state information between the artificial intelligence apparatus 100 and the floor on which the artificial intelligence apparatus 100 is placed, using the floor strength information.

For example, if the floor on which the artificial intelligence apparatus 100 is placed is made of a material such as leather or fabric and thus has a soft floor strength, the artificial intelligence apparatus 100 may have a low possibility of slipping due to vibration. Therefore, if the floor strength is soft, the processor 180 may determine that the possibility of slipping of the artificial intelligence apparatus 100 is low.

In addition, for example, if the floor on which the artificial intelligence apparatus 100 is placed is made of a material such as glass, wood, plastic, and marble and has a hard floor strength, the artificial intelligence apparatus 100 may have a high probability of slipping due to vibration notification. Accordingly, the processor 180 may determine that the artificial intelligence apparatus 100 has a high possibility of slipping if the floor strength is hard.

The processor 180 may obtain the floor strength information output by the floor strength prediction model by providing the equilibrium state information and the noise data to the floor strength prediction model which outputs the floor strength information of the floor on which the artificial intelligence apparatus 100 is placed.

Figure 6:
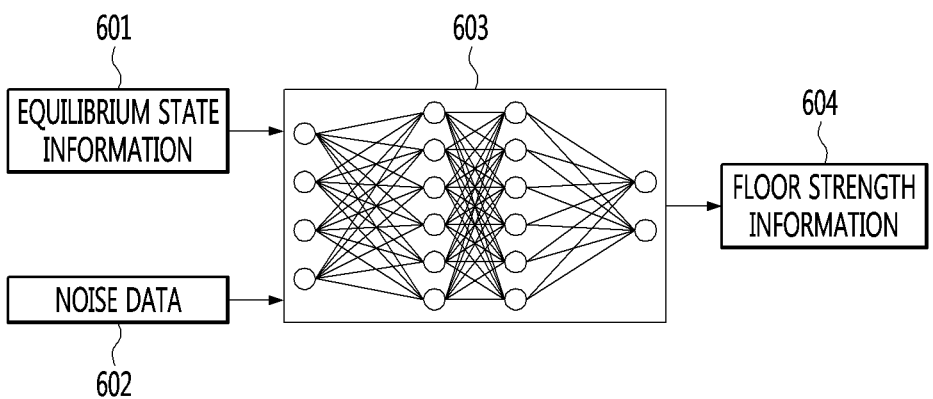
FIG. 6 is a view illustrating a floor strength prediction model according to an embodiment of the present disclosure.

Referring to FIG. 6, the floor strength prediction model 603 may be an artificial neural network model which is learned based on learning data labeled with predetermined floor strength information on the predetermined equilibrium state information 601 and predetermined noise data 602. The noise data may be a noise level value according to the amplitude of the noise.

The floor strength prediction model may be an artificial neural network (ANN) model used in machine learning. The floor strength prediction model may consist of artificial neurons (nodes) networked by synapses. The floor strength prediction model may be defined by a connection pattern between neurons of another layer, a learning process of updating model parameters, and an activation function generating an output value.

The floor strength prediction model may include an input layer, an output layer, and optionally one or more hidden layers. Each layer includes one or more neurons, and the artificial neural network may include synapses which connect neurons to neurons. In an artificial neural network, each neuron may output a function value of an active function for input signals, weights, and deflections input through a synapse.

The floor strength prediction model may be generated through supervised learning, unsupervised learning, or reinforcement learning according to a learning method.

For example, if the floor strength prediction model is generated through supervised learning, a label for the learning data may be learned in a given state. The label may mean a correct answer (or result value) which should be inferred by the artificial neural network if the learning data is input to the artificial neural network.

The floor strength prediction model may be an artificial neural network model which is learned by the learning processor 130 of the artificial intelligence apparatus 100 and generated or an artificial neural network model which is learned by the learning processor 240 of the artificial intelligence server 200 and generated.

The learning processors 130 and 240 may designate a label specifying floor strength with respect to predetermined equilibrium state information and predetermined noise data. For example, each of the soft floor strength information and the hard floor strength information may be labeled and designated.

For example, the learning processors 130 and 240 may use the learning data collected using the artificial intelligence apparatus 100 which is placed in various positions on the floor having various floor strengths and vibrates. Therefore, if new equilibrium state information and noise data are input, the learning processors 130 and 240 can determine the floor strength information label of the floor on which the artificial intelligence apparatus is placed to predict the floor strength.

The processor 180 may determine the vibration notification strength based on the floor strength information (S505).

If the processor 180 determines that the artificial intelligence apparatus 100 is placed on the floor which has a high probability of slipping by the vibration notification based on the floor strength information, the processor 180 may further lower the vibration notification strength than the previous vibration notification strength.

For example, the haptic module 153 may sequentially output the first vibration notification and the second vibration notification. The gyro sensor 141 may obtain the equilibrium state information of the artificial intelligence apparatus 100 when the first vibration notification is output. The microphone 122 may obtain noise data generated due to the first vibration notification. The processor 180 may obtain the floor state information by providing the equilibrium state information and the noise data to the floor strength prediction model. If the processor 180 determines that the vibration notification is to be lowered based on the obtained floor state information, the processor 180 may further lower the vibration strength of the second vibration notification than the first vibration notification strength.

In addition, if the processor 180 determines that the artificial intelligence apparatus 100 is placed on the floor having a low possibility of slipping by the vibration notification based on the floor strength information, the processor 180 may further increase the vibration notification strength than the previous vibration notification strength. Therefore, if the falling probability of the artificial intelligence apparatus 100 is low, the vibration notification strength may increase so that the user may easily recognize the notification.

Therefore, the processor 180 may prevent the artificial intelligence apparatus 100 from falling by determining the strength of the vibration notification according to the strength of the floor on which the artificial intelligence apparatus 100 is placed.

Figure 7:
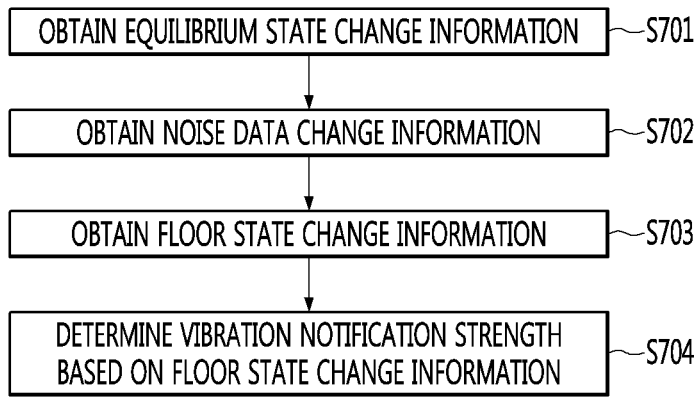
FIG. 7 is an operation flowchart illustrating a method for determining a vibration notification strength using floor state change information according to an embodiment of the present disclosure.

FIG. 7 is an operation flowchart illustrating a method for determining a vibration alert strength using floor state change information according to an embodiment of the present disclosure.

The processor 180 may obtain the equilibrium state change information regarding the change of the equilibrium state information for a preset time (S701).

The gyro sensor 142 may obtain the equilibrium state information of the artificial intelligence apparatus 100 whenever a plurality of vibration notifications are sequentially output. The processor 180 may obtain the equilibrium state change information on the change of the equilibrium state information for a preset time based on the equilibrium state information obtained whenever the vibration notification is output.

For example, the processor 180 compares the first equilibrium state information of the artificial intelligence apparatus 100 when the first vibration notification is output with the second equilibrium state information of the artificial intelligence apparatus 100 when the second vibration notification is output and can obtain the equilibrium state change information.

The processor 180 may compare information on the height, the rotation, and the inclination of the artificial intelligence apparatus 100 included in the first equilibrium state information with information on the height, the rotation, and the inclination of the artificial intelligence apparatus 100 included in the second equilibrium state information and obtain the change in height, rotation, and inclination of the artificial intelligence apparatus 100.

The equilibrium state change information may include at least one of a height change value, a rotation change value, and a change value of an inclination of the artificial intelligence apparatus 100. The processor 180 may grasp the effects of the vibration notification on the movement of the artificial intelligence apparatus 100 using the equilibrium state change information.

The processor 180 may obtain noise data change information on the change of the noise data during the preset time (S702).

The microphone 122 may obtain noise data generated by vibration of the artificial intelligence apparatus 100 whenever a plurality of vibration notifications are sequentially output. Whenever the vibration notification is output, the processor 180 may obtain noise data change information on a change in the noise data for a preset time based on the obtained noise data.

For example, the processor 180 may compare first noise data generated by the vibration of the artificial intelligence apparatus 100 when the first vibration notification is output with second noise data generated by the vibration of the artificial intelligence apparatus 100 when the second vibration notification is output and obtain the noise data change information. The processor 180 may obtain a change in the noise level by comparing the noise level of the first noise data with the noise level of the second noise data. Since the noise data generated by the vibration notification also changes according to the change of the floor state of the floor on which the artificial intelligence apparatus 100 is placed, the processor 180 may use the noise data change information to grasp the change in the floor state of the floor on which the artificial intelligence apparatus 100 is placed due to the vibration notification.

Meanwhile, the artificial intelligence apparatus 100 may include a plurality of microphones 122.

If the artificial intelligence apparatus 100 includes a plurality of microphones 122, each of the plurality of noise data may be obtained from each of the plurality of microphones 122. Each of the plurality of noise data obtained from each of the plurality of microphones 122 may have a different noise amplitude.

For example, when the artificial intelligence apparatus 100 is a smartphone, the first microphone 122 may be provided at an upper end of the artificial intelligence apparatus 100 and the second microphone 122 may be provided at a lower end of the artificial intelligence apparatus 100.

For example, if the artificial intelligence apparatus 100 is placed at the corner of the table, the artificial intelligence apparatus 100 may move due to the first vibration notification, and the lower end portion of the artificial intelligence apparatus 100 may protrude out of the table to increase the possibility of falling of the artificial intelligence apparatus 100. In this case, the noise level of the second noise data obtained by the second microphone 122 provided at the lower end of the artificial intelligence apparatus 100 at the time of outputting the second vibration notification may further lower than the noise level of the first noise data obtained at the time of the first vibration notification. Therefore, the processor 180 may obtain change information of the noise data obtained through the second microphone for a preset time, and provide change information of the noise data to the floor state prediction model to obtain the floor state change information. In this case, the floor state prediction model may output information that a portion of the artificial intelligence apparatus 100 is not adjacent to the floor but spans the table.

The processor 180 may provide the equilibrium state change information and the noise data change information to the floor state change prediction model which outputs the state change information of the floor on which the artificial intelligence apparatus 100 is placed, and obtain the floor state change information output by the floor state change prediction model (S703).

Figure 8:
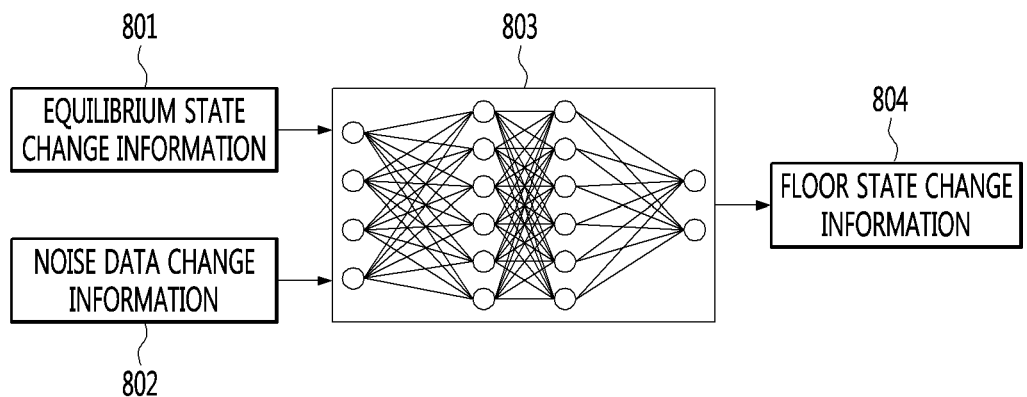
FIG. 8 is a view illustrating a floor state change prediction model according to an embodiment of the present disclosure.

Referring to FIG. 8, the floor state prediction model 803 may be an artificial neural network model which is learned based on learning data in which the predetermined floor state change information is labeled with respect to the predetermined equilibrium state change information 801 and the predetermined noise data change information 802. The noise data change information 802 may be change information on each of the plurality of noise data which can be obtained by the plurality of microphones.

The floor state prediction model may be an artificial neural network model which is learned by the learning processor 130 of the artificial intelligence apparatus 100 and generated or an artificial neural network model which is learned by the learning processor 240 of the artificial intelligence server 200 and generated.

The learning processors 130 and 240 may designate a label specifying a predetermined floor state change with respect to the predetermined equilibrium state change information and the predetermined noise data change information.

For example, a label specifying a change in the predetermined floor state may include labels with respect to the information on a state where a portion of the artificial intelligence apparatus 100 is not adjacent to the floor and information on a state where all portions of the artificial intelligence apparatus 100 are adjacent to the floor.

Therefore, when the new equilibrium state change information and the noise data change information are input, the floor state prediction model determines a floor state information label of the floor on which the artificial intelligence apparatus is placed and can predict whether a portion or all portions of the artificial intelligence apparatus 100 is(are) in a state of being adjacent to the floor by the label.

For example, if the artificial intelligence apparatus 100 is in a state where a portion of the artificial intelligence apparatus 100 is not adjacent to the floor due to the first vibration notification, the equilibrium state information and the noise data measured at the time of the second vibration notification can change. Since the floor state prediction model is a model which is learned to output the change of the floor state by using the equilibrium state information and the change information of the noise data, the floor state prediction model may output floor state change information indicating that a portion of the artificial intelligence apparatus 100 is not adjacent to the floor.

The processor 180 may determine the vibration notification strength based on the floor state change information (S704).

If the processor 180 determines that a portion of the artificial intelligence apparatus 100 is not adjacent to the floor based on the floor state change information, the processor 180 may further lower the vibration notification strength than the previous vibration notification strength. Therefore, if the falling probability of the artificial intelligence apparatus 100 is high, the vibration notification strength may be lowered to prevent the falling.

In addition, if the processor 180 determines that all portions of the artificial intelligence apparatus 100 are adjacent to the floor based on the floor state change information, the processor 180 may further increase the vibration notification strength than the previous vibration notification strength. Therefore, if the falling possibility of the artificial intelligence apparatus 100 is low, the user can easily recognize the notification by increasing the vibration notification strength.

In addition, the processor 180 may determine the vibration notification strength based on the floor strength information and the floor state change information. For example, if it is determined that the floor has a soft strength and all portions of the artificial intelligence apparatus 100 are adjacent to the floor based on the floor strength information and the floor state change information, the processor 180 may increase the vibration notification strength. Alternatively, the processor 180 may lower the vibration notification strength if it is determined that the floor has a hard strength or a portion of the artificial intelligence apparatus 100 is not adjacent to the floor based on the floor strength information and the floor state change information.

Figure 9:
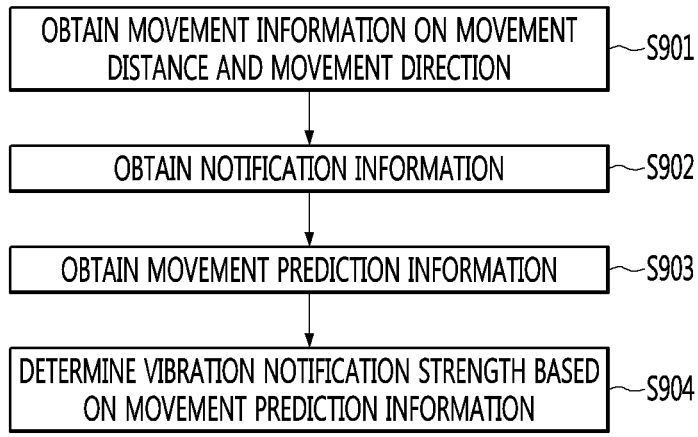
FIG. 9 is an operation flowchart illustrating a method for determining the vibration notification strength by using the movement prediction information according to an embodiment of the present disclosure.

FIG. 9 is an operation flowchart illustrating a method for determining the vibration alert strength by using the movement prediction information according to an embodiment of the present disclosure.

The acceleration sensor 142 may obtain movement information on a movement distance and a movement direction of the artificial intelligence apparatus 100 (S901).

The movement information may include information on a movement distance and a movement direction of the artificial intelligence apparatus 100.

The acceleration sensor 142 may obtain movement information of the artificial intelligence apparatus 100 whenever a vibration notification is output by the haptic module 153. Therefore, whenever a plurality of vibration notifications are sequentially output, the acceleration sensor 142 obtains movement information of the artificial intelligence apparatus 100, and thus the processor 100 can check the effects on the movement of the artificial intelligence apparatus 100 by each of the vibration notifications by using the plurality of obtained movement information.

The processor 180 may obtain the notification information on the number of notifications corresponding to the vibration notification from the memory 170 storing the notification information on the number of notifications until each of the at least one notification is stopped for each of the at least one notification (S902).

The memory 170 may store notification information on the number of notifications until each of the at least one notification is stopped for each of the at least one notification. For example, when a call is received by the artificial intelligence apparatus 100, a call vibration notification may be output, and the vibration notification may be repeated until the user receives a call and stops the vibration notification. The memory 170 may store the notification information on the number of notifications until the call vibration notification is stopped for the call vibration notification. The processor 180 may obtain the average number of notifications until the call vibration notification is stopped using the stored notification information. The memory 170 may store the number of repetitions of the vibration notification whenever the vibration notification starts and ends.

The processor 180 provides the movement information obtained by the acceleration sensor 142, the equilibrium state information obtained by the gyro sensor 141, and the notification information to a movement prediction model which outputs movement prediction information on a distance and a direction in which the artificial intelligence apparatus can move due to a predetermined vibration notification (S903).

Figure 10:
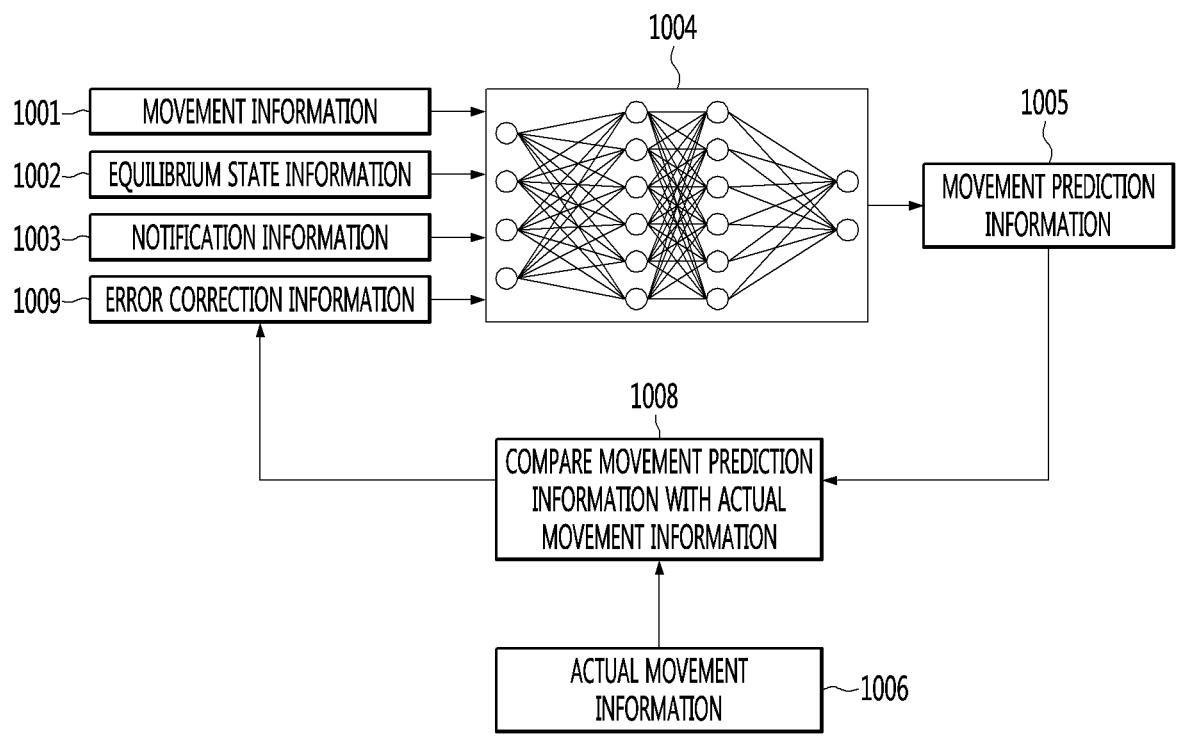
FIG. 10 is a view illustrating a movement information prediction model according to an embodiment of the present disclosure.

Referring to FIG. 10, the movement prediction model 1004 may be an artificial neural network model which is learned based on the learning data in which predetermined movement prediction information 1005 is labeled with respect to predetermined movement information 1001, predetermined equilibrium state information 1002, and predetermined notification information 1003. In this case, the predetermined notification information 1003 may include information on an average number of notifications corresponding to the vibration notification. In addition, the predetermined notification information 1003 may also include information on the number of remaining notifications obtained by subtracting the number of times the vibration notification is repeated from the average number of notifications.

The floor state prediction model may be an artificial neural network model which is learned by the learning processor 130 of the artificial intelligence apparatus 100 and generated or an artificial neural network model which is learned by the learning processor 240 of the artificial intelligence server 200 and generated.

The learning processors 130 and 240 may designate a label which specifies predetermined movement prediction information with respect to the predetermined movement information, the predetermined equilibrium state information, and the noise notification information.

For example, the label specifying the movement prediction information may include a label for information on the movement distance and the movement direction which can be moved by the artificial intelligence apparatus 100 until the next vibration notification or until the vibration notification is stopped.

For example, the movement prediction model may be a model which is learned so as to predict a movement distance and a movement direction of the artificial intelligence apparatus 100 until the next second vibration notification or until the vibration notification is stopped if the artificial intelligence apparatus 100 moves the predetermined movement distance in the predetermined movement direction due to the first vibration notification in a state where the artificial intelligence apparatus 100 is placed on the floor with the predetermined inclination.

In addition, if the second vibration notification occurs, the learning processors 130 and 240 may obtain actual movement information 1006 obtained by the acceleration sensor 142, compares the movement prediction information with the actual movement information with each other 1008, and obtain information 1009 for being capable of correcting an error. The learning processors 130 and 240 may relearn the movement prediction model 1004 using the error correction information 1009.

The processor 180 may determine the vibration notification strength based on the movement prediction information (S904).

The processor 180 may lower the vibration notification strength if it is predicted that the artificial intelligence apparatus 100 moves a preset distance or more based on the movement prediction information. Therefore, if the falling possibility of the artificial intelligence apparatus 100 is high, the next vibration notification strength may be lowered to prevent the falling.

The processor 180 may obtain the average number of notifications until the vibration notification is stopped based on the notification information.

The processor 180 may determine the vibration notification strength based on the movement prediction information and the average number of notifications. For example, if the repetition number of vibration notifications until the first vibration notification is three times and the average number of notifications is ten times, the processor 180 may obtain the vibration notification repetition prediction number information that seven vibration notifications can be repeated on average. The processor 180 may check that the movement distance of the artificial intelligence apparatus 100 is predicted to be 1 cm if the vibration is notified based on the movement prediction information, and predict that the artificial intelligence apparatus 100 moves by 7 cm for the remaining seven times of the number of vibration notifications. The processor 180 may determine to lower the vibration notification strength when the total movement prediction distance of the artificial intelligence apparatus 100 is equal to or greater than the preset movement distance during the remaining vibration notification.

The present disclosure may be embodied as computer-readable codes on a program-recorded medium. The computer-readable recording medium may be any recording medium that can store data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. The computer may also include the control unit 180 of the artificial intelligence apparatus.

What is claimed is:

1. An artificial intelligence apparatus comprising:
    a haptic device configured to output a vibration notification;
    a microphone configured to obtain noise data generated due to the vibration notification;
    a gyro sensor configured to obtain equilibrium state information of the artificial intelligence apparatus; and
    a processor configured to:
        obtain surface strength information of a surface on which the artificial intelligence apparatus is resting on, wherein the surface strength information is obtained by inputting the equilibrium state information and the noise data into a surface strength prediction model, wherein the surface strength prediction model outputs the surface strength information of the surface, and
        determine a strength of the vibration notification based on the obtained surface strength information.

2. The artificial intelligence apparatus of claim 1,
    wherein the surface strength prediction model is an artificial neural network which is trained based on learning data labeled with predetermined surface strength information on predetermined equilibrium state information and predetermined noise data.

3. The artificial intelligence apparatus of claim 1,
    wherein the processor is further configured to:
        obtain equilibrium state change information on a change of the equilibrium state information for a preset time period,
        obtain noise data change information on a change of the noise data during the preset time period,
        input the obtained equilibrium state change information and the obtained noise data change information into a surface state change prediction model for outputting state change information of the surface on which the artificial intelligence apparatus is resting on,
        obtain a surface state change information using the surface state change prediction model, and
        determine the strength of the vibration notification based on the obtained surface state change information.

4. The artificial intelligence apparatus of claim 3,
    wherein the processor is further configured to determine to lower the strength of the vibration notification upon a determination that a portion of the artificial intelligence apparatus is not resting on the surface based on the obtained surface state change information.

5. The artificial intelligence apparatus of claim 3,
    wherein the surface state change prediction model is an artificial neural network which is trained based on learning data labeled with predetermined surface state change information on predetermined equilibrium state change information and predetermined noise data change information.

6. The artificial intelligence apparatus of claim 5,
    wherein the surface state change prediction model is an artificial neural network model which is trained based on a plurality of noise data change information, wherein the plurality of noise data change information is obtained from a plurality of microphones.

7. The artificial intelligence apparatus of claim 1, further comprising:
    an acceleration sensor configured to obtain movement information on a movement distance and a movement direction of the artificial intelligence apparatus; and
    a memory configured to store notification information on a number of notifications, wherein the notifications information corresponds to the number of notifications until each of at least one notification is stopped for each of at least one notification;
    wherein the processor is further configured to:
        obtain movement prediction information using a movement prediction model by inputting at least the movement information, the equilibrium state information, and the notification information into the movement prediction model, wherein the movement prediction model outputs the movement prediction information on a distance and a direction to be moved by the artificial intelligence apparatus due to a predetermined vibration notification, and
        wherein the determination of the strength of the vibration notification is further based on the movement prediction information.

8. The artificial intelligence apparatus of claim 7,
    wherein the processor is further configured to determine to lower the strength of the vibration notification upon a determination that the artificial intelligence apparatus is predicted to move at least a preset distance based on the movement prediction information.

9. The artificial intelligence apparatus of claim 7,
    wherein the processor is further configured to:
        obtain an average number of vibrations until the vibration notification is stopped when the artificial intelligence apparatus receives a call, a text, or generates a notification, wherein the average number of vibrations is obtained based on the notification information, and
        determine the strength of the vibration notification based on the movement prediction information and the average number of vibrations.

10. A method comprising:
    outputting a vibration notification;
    obtaining noise data generated due to the vibration notification;
    obtaining equilibrium state information of an artificial intelligence apparatus;
    obtaining surface strength information of a surface on which the artificial intelligence apparatus is resting on, wherein the surface strength information is obtained by inputting the equilibrium state information and the noise data into a surface strength prediction model, wherein the surface strength prediction model outputs the surface strength information; and
    determining a strength of the vibration notification based on the obtained surface strength information.

11. The method of claim 10,
    wherein the surface strength prediction model is an artificial neural network which is trained based on learning data labeled with predetermined surface strength information on predetermined equilibrium state information and predetermined noise data.

12. The method of claim 10,
wherein the strength of the vibration notification is determined based on:
- obtaining equilibrium state change information on a change of the equilibrium state information for a preset time period,
- obtaining noise data change information on the change of the noise data during the preset time period,
- inputting the obtained equilibrium state change information and the obtained noise data change information into a surface state change prediction model for outputting state change information of the surface on which the artificial intelligence apparatus is resting on,
- obtaining a surface state change information using the surface state change prediction model and
- determining the strength of the vibration notification based on the surface state change information.

13. The method of claim 12,
wherein the strength of the vibration notification is determined based on:
- determining lower the strength of the vibration notification upon a determination that a portion of the artificial intelligence apparatus is not resting on the surface based on the obtained surface state change information.

14. The method of claim 12,
wherein the surface state change prediction model is an artificial neural network which is trained based on learning data labeled with predetermined surface state change information on predetermined equilibrium state change information and predetermined noise data change information.

15. The method of claim 14,
wherein the surface state change prediction model is an artificial neural network model which is trained based on a plurality of noise data change information, wherein the plurality of noise data change information is obtained from each of a plurality of microphones.

16. The method of claim 10,
wherein the strength of the vibration notification is determined based on:
- obtaining movement information on a movement distance and a movement direction of the artificial intelligence apparatus;
- obtaining notification information on a number of notifications corresponding to the vibration notification from a memory configured to store notification information on the number of notifications until each of at least one notification is stopped for each of at least one notification;
- obtaining movement prediction information using a movement prediction model by inputting at least the movement information, the equilibrium state information, and the notification information into the movement prediction model, wherein the movement prediction model outputs the movement prediction information on a distance and a direction to be moved by the artificial intelligence apparatus due to a preset vibration notification; and
- determining the strength of the vibration notification based on the movement prediction information.

17. The method of claim 16,
wherein the strength of the vibration notification is determined based on:
- determining whether to lower the strength of the vibration notification upon a determination that the artificial intelligence apparatus is predicted to move at least a preset distance based on the movement prediction information.

18. The method of claim 16,
wherein the strength of the vibration notification is determined based on:
- obtaining an average number of vibrations until the vibration notification is stopped based on the notification information; and
- determining the strength of the vibration notification based on the movement prediction information and the average number of vibrations.

* * * * *